STATIC SWITCHING APPARATUS

Filed Oct. 29, 1959 2 Sheets-Sheet 1

INVENTOR.
CULLMAN K. LEONARD
BY
Carl Baker
ATTORNEY-

Oct. 27, 1964 C. K. LEONARD 3,154,690

STATIC SWITCHING APPARATUS

Filed Oct. 29, 1959 2 Sheets-Sheet 2

INVENTOR.
CULLMAN K. LEONARD
BY
Carl Baker
ATTORNEY 3,154,690
STATIC SWITCHING APPARATUS
Cullman K. Leonard, Hamilton, Ohio, assignor to General Electric Company, a corporation of New York
Filed Oct. 29, 1959, Ser. No. 849,679
9 Claims. (Cl. 307—88)

This invention relates generally to electrical control apparatus and more particularly to electric switch apparatus of "static" type incorporating no moving parts.

Static switching apparatus differs from the more commonly used relays and other electromechanical switching elements in having the ability to perform its switching functions through purely electrical means and without need for mechanical movement. Static switching accordingly offers important advantages in many service applications wherein mechanical shock, vibration or ambient temperature conditions are too extreme for reliable operation of relays and like electromechanical devices. These conditions are frequently encountered in aircraft jet engine applications, for example, where the need for reliability of operation is particularly critical.

While various of the static switching devices heretofore proposed have at least partially realized certain of the advantages just enumerated, they generally have not fully exploited these advantages and also have commonly suffered from certain disadvantages, particularly with respect to circuit complexity and poor reliability. The present invention has as a primary object the provision of static switching apparatus which more fully exploits available advantages of the type and which is characterized by good reliability of operation and simplicity of construction.

It is also an object of the invention to provide novel switching apparatus of static type which affords good accuracy of switch point together with "snap" action to, and positive interlock in, the "on" condition, with these purposes all served by common circuit means. A further object is the provision of such static switching apparatus incorporating improved means for resetting the apparatus either manually or automatically as a function of control input.

Another object of the invention is the provision of new and improved static switching apparatus with circuitry arranged to facilitate location of the apparatus remotely from its controlled load, and further to facilitate reset of the apparatus from such remote location. Still another object is the provision of static switching apparatus operative to switch to "on" condition at predetermined input signal level and to automatically reset to "off" condition when the input signal falls below that initial signal level a predetermined definite amount.

Briefly stated, in accordance with one aspect of the invention static switching of electrical power to a load device is effected by provision of electrical amplifier means with output connected to energize the load device and an associated impedance bridge network which supplies to the amplifier a feedback signal indicative of bridge unbalance. This bridge network is so arranged as to be unbalanced in one direction at low amplifier output level and simultaneously to supply an amplifier feedback signal which is degenerative in effect, and to reverse the direction of unbalance at predetermined higher amplifier output level so that the feedback signal now becomes regenerative causing the amplifier output to the load to further increase quickly to full "on" and remain so. In practice this necessary reversal of feedback signal polarity from degenerative to regenerative preferably is effected by use of a nonlinear resistance element appropriately connected into the bridge network. Reset means which may be either manual or automatic in operation are provided for the purpose of resetting the amplifier to "off" condition, preferably by again reversing the feedback signal polarity to make it degenerative in effect.

The invention will be further understood and its various objects, features and advantages more fully appreciated by reference to the appended claims and the following detailed description when read in conjunction with the accompanying drawings, wherein:

Figure 1:
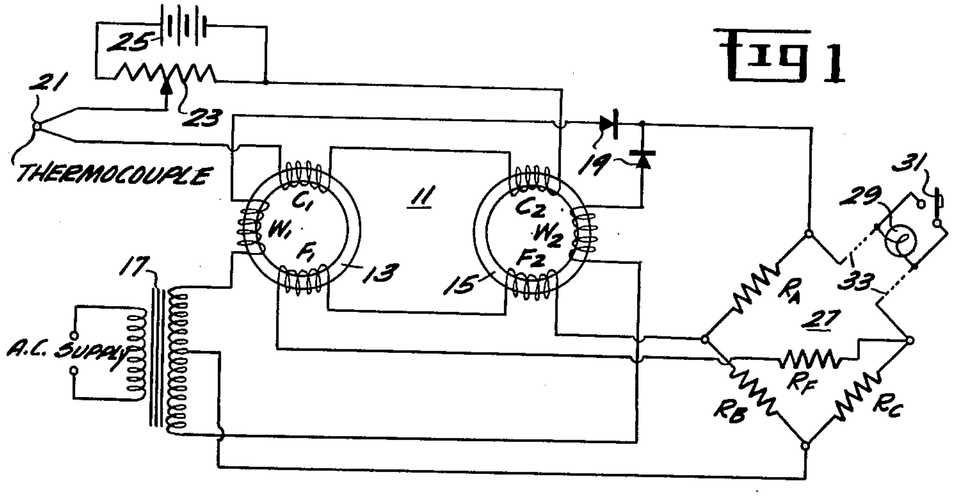
FIGURE 1 is a schematic circuit diagram of static switching apparatus in accordance with the invention.

With continued reference to the drawings, wherein like reference characters have been used throughout to designate like elements, FIGURE 1 illustrates the invention as embodied in an overtemperature indicating system incorporating a switching amplifier of magnetic amplifier type. It is to be understood, however, that apparatus in accordance with the invention may equally well indicate or control variables other than temperature, and that other forms of electrical amplifier devices such, for example, as vacuum tube and transistor type amplifiers, may alternatively be used and may offer advantages in some applications.

In FIGURE 1, the magnetic amplifier designated generally by reference numeral 11 includes a pair of saturable magnetic core members 13 and 15 having main windings $W_1$ and $W_2$, control windings $C_1$ and $C_2$, and feedback windings $F_1$ and $F_2$, respectively. The main windings $W_1$ and $W_2$ are energized by a transformer 17 and connected to the amplifier load through unidirectional current flow means 19, which preferably are semiconductor diodes of the indicated polarities.

The amplifier control windings $C_1$ and $C_2$ are connected to a control signal source which in the illustrated embodiment takes the form of a thermocouple element 21. The voltage output of this couple is connected in opposition to a reference voltage obtained from a potentiometer 23 across which is connected a battery 25 or other suitable D.-C. voltage source. Adjustment of potentiometer 23 enables balance of the thermocouple output and reference voltages at any desired temperature level and thus affords adjustment of the control point of the system. For best accuracy, suitable cold junction temperature reference or temperature compensation means (not shown) may be incorporated into the system in well known manner.

The amplifier load comprises an impedance bridge network designated generally by reference numeral 27. The impedance elements in three of the bridge arms take the form of resistors $R_a$, $R_b$ and $R_c$. The remaining arm of the bridge includes a nonlinear resistance element 29 which as illustrated is constituted by an incandescent filament lamp. This lamp serves as an overtemperature indicator and at the same time controls bridge balance as hereinafter explained. Bridge unbalance is communicated as a feedback signal, preferably through a signal level control resistor $R_f$, to the feedback windings $F_1$ and $F_2$ on core elements 13 and 15, respectively.

As is well known, the ohmic resistance of incandescent filament lamps is "nonlinear" in the sense that when the lamp is unlit its filament resistance is substantially lower—typically several times lower—than when the filament is heated to incandescence. Here the lamp 29 is selected to have hot and cold resistance values so related to the resistance values $R_a$, $R_b$ and $R_c$ that when the lamp is cold the bridge is unbalanced in one direction and when hot the bridge again is unbalanced but now in the opposite direction. In other words, the filament resistance when cold is substantially less than $R_cR_a/R_b$, and the filament resistance when hot is substantially greater than this value.

It will be understood that any of several different arrangements of the impedance elements within the bridge network may equally well be used, it being only necessary that this arrangement be properly coordinated with the direction or "sense" of the amplifier feedback windings $F_1$ and $F_2$. The relationship must be such that the feedback signal with cold lamp filament is negative or degenerative, and that when the filament heats the feedback signal reverses to become positive or regenerative.

In operation, when the thermocouple output and reference voltages are equal there is no net signal input to the amplifier control windings $C_1$ and $C_2$, and the amplifier accordingly is in quiescent state producing only a small residual D.-C. output voltage. This generates appreciable voltage drop across each of the resistance elements in the bridge network, but the voltage drop across the filament of lamp 29 is insufficient to cause incandescence and the lamp therefore remains in its cold or unlighted state. Under these conditions the amplifier feedback signal is negative, thus affording the good linearity and stability characteristic of negative feedback amplifier operation.

When the thermocouple supplies an input signal to the amplifier control windings $C_1$ and $C_2$, the amplifier output voltage then increases and greater current flows through the lamp 29 and the other resistance elements in the bridge network. This increase in lamp current causes heating of the lamp filament with consequent increase in filament resistance, and ultimately the filament resistance exceeds the value $R_cR_a/R_b$ causing a reversal of polarity of the feedback signal measured across the bridge.

Thus, as lamp current increases the feedback voltage becomes less negative and ultimately reverses to become positive. The feedback signal then has a strong regenerative effect on the amplifier and it "snaps" to full output, causing the lamp to glow brightly. The magnitude of the positive feedback signal under these conditions is such that the input signal no longer has any controlling effect on amplifier operation, and the lamp accordingly is interlocked to full "on" by regenerative amplifier feedback. The lamp therefore will remain on even though the input signal to the amplifier now drops to zero.

Figure 2:
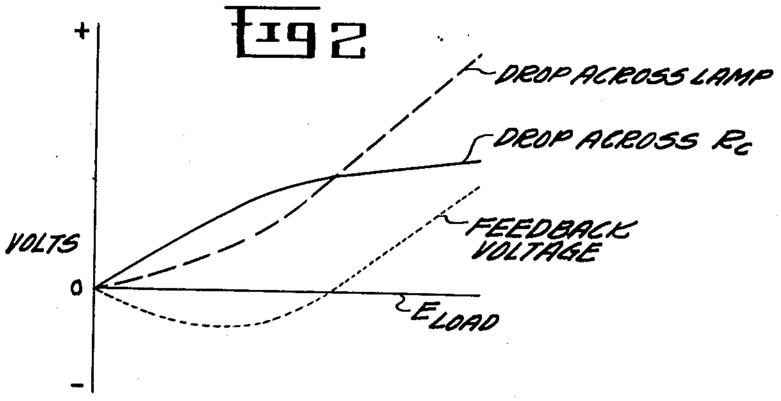
FIGURE 2 illustrates voltage relationships in the static switching circuit of FIGURE 1.

FIGURE 2 illustrates voltage relationships in the switching circuit just described as the amplifier switches from "off" to full "on" condition. The curve labeled "feedback voltage" in FIGURE 2 defines voltage values which are determined by algebraic addition of points on the curves marked "Voltage Drop Across $R_c$" and "Voltage Drop Across Lamp." As shown, the feedback voltage thus determined changes from negative to positive as the lamp filament is heated by application of the amplifier output voltage ($E_{load}$) across the bridge network.

Thus, the curve of voltage drop across the lamp has an initial slope which is less than that of the drop across $R_c$, because the resistance of the lamp filament when cold is proportionately less than $R_c$. The filament resistance increases with increase in applied voltage and consequent increase in filament current flow, however, and ultimately the relative slopes of the two curves become such that the curves cross. At this crossover point the feedback signal changes from negative to positive, as clearly apparent in FIGURE 2.

The design values selected for the circuit of FIGURE 1 preferably are such that feedback signal polarity reversal occurs at an amplifier output voltage below the voltage at which the lamp filament begins to glow visibly. Visually, then, the lamp is either totally dark or totally bright; there is no intermediate glow.

A reset switch 31 preferably is provided for switching the amplifier off, and as shown this reset switch is connected across terminals of lamp 29 so as to short-circuit the lamp filament when the reset switch is closed. Shorting the filament is effective to reverse the polarity of the feedback signal, since in effect this makes the filament resistance again less than the value $R_cR_a/R_b$. The feedback signal accordingly is again negative or degenerative and operative to cut the amplifier off, assuming no input signal is now being supplied it. The shorted filament immediately cools and returns to its original low resistance value. Hence when the reset switch 31 is reopened, the feedback signal will remain degenerative and the amplifier will keep the lamp "off" until application of another control signal to the amplifier.

As just explained, the amplifier feedback signal becomes strongly degenerative immediately upon closing the reset switch. The amplifier output therefore falls immediately to low level and remains there so long as the reset switch is held closed. In this manner the amplifier operates to protect itself against overload even if the reset switch should be held closed for long periods of time.

It will be noted that only two leads 33 are necessary to connect the pilot lamp 29 and reset switch 31 to the static switching circuitry. This facilitates remote location of the apparatus; for example the static switching circuitry might in the case of aircraft engine application be mounted directly to the engine with the pilot lamp and reset switch remotely located in the pilot's compartment, and only two wires then are needed between these points in order to enable both indication (or control) and reset functions.

Figure 3:
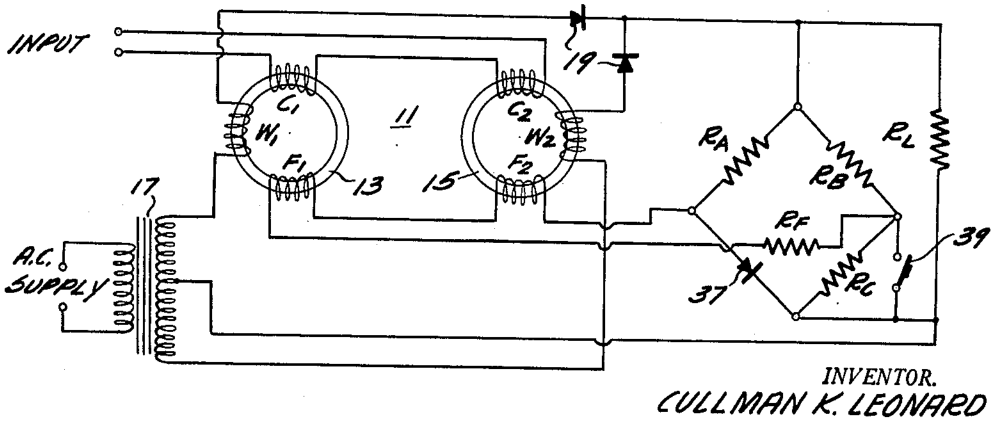
FIGURE 3 is a schematic circuit diagram of one alternative form of apparatus in accordance with the invention.

Referring now to the alternative embodiment of the invention shown in FIGURE 3, the amplifier and power supply portions of this circuit are similar to the corresponding elements in FIGURE 1 and like reference numerals have therefore been used in both figures. The circuit of FIGURE 3 differs from that of FIGURE 1 in several important respects, however, principally in that the nonliner resistance element is of different type and does not itself constitute the load to be controlled as in the case of the pilot lamp of FIGURE 1.

In FIGURE 3 the load resistance element $R_L$ is shown connected in parallel with the impedance bridge and the nonlinear resistance element within the bridge is constituted by a unidirectional current flow device 37, preferably a semiconductor diode, having an approximately constant forward voltage characteristic. This constant forward voltage characteristic is instrumental in providing the desired reversal of feedback signal polarity and in controlling operation of the magnetic amplifier as will now be explained.

When the amplifier is quiescent or nearly so and supplying only low current output to the load resistnce $R_L$ and the impedance bridge, the ratio of the voltage drop across the diode 37 to that across $R_a$ exceeds the ratio $R_c/R_b$ and the feedback voltage is applied to the amplifier with degenerative or negative polarity. These desired relationships are attained by selection of diode 37 and resistors $R_a$, $R_b$ and $R_c$ of appropriate values such as that the diode constant forward voltage is proportionally more than the voltage drop across resistor $R_a$ due to current flow through it with the amplifier quiescent.

Now if input signal level to the amplifier is increased with consequent increase in amplifier output current, the voltage drop across the diode 37 remains approximately constant, due to its constant forward voltage characteristic, while the voltage drop across $R_a$ will increase in general proportionality to the increase in current flow. The magnitude of the negative feedback signal will therefore diminish and fall to zero when the ratio between voltage drops across the diode and $R_a$ is just equal to the ratio $R_c/R_b$.

As amplifier output current increases beyond this point, the ratio of voltage drops across the diode and $R_a$ is now exceeded by the ratio $R_c/R_b$ and the feedback signal accordingly reverses polarity to become regenerative or positive. The output of the amplifier then builds up very rapidly even with low input signal, further increasing the positive feedback which in turn increases the magnitude of output voltage. The amplifier thus is forced to "snap" to full output. At full amplifier output the magnitude of positive feedback is such, by design, that the amplifier interlocks itself to full "on" even though the motivating input signal is removed.

Resetting of the amplifier may conveniently be accomplished by use of a reset switch 39 in generally the same fashion as previously described in connection with the circuit of FIGURE 1. In FIGURE 3, however, the reset switch is connected across a bridge resistance element other than the nonlinear one. As illustrated, the switch 39 is connected across resistor $R_c$, so that closing the switch is instantly effective to reverse the feedback voltage to be of negative polarity and thus force the amplifier to reduce output to quiescent value. When the reset contacts then are opened, the voltage drop across the diode is again greater than that across $R_a$ and the feedback signal remains negative. The amplifier therefore remains off, ready for another switching operation upon re-application of the motivating signal.

Figure 4:
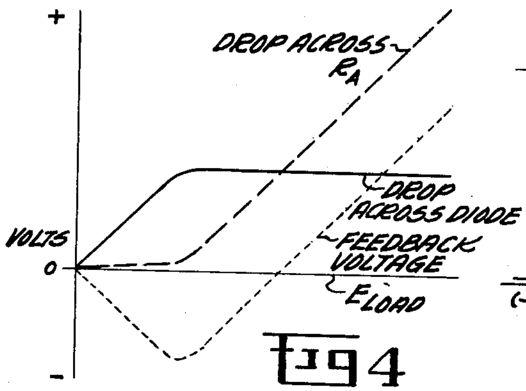
FIGURE 4 illustrates voltage relationships in the static switching circuit of FIGURE 3.

FIGURE 4, which illustrates voltage drops and feedback signal polarity in the circuit of FIGURE 3, shows them to be substantially similar to those of FIGURES 1 and 2. Thus, the change in relative slopes of the curves of diode and $R_a$ voltage drops, together with the resulting reversal of feedback signal polarity, is clearly apparent in FIGURE 4.

Figure 5:
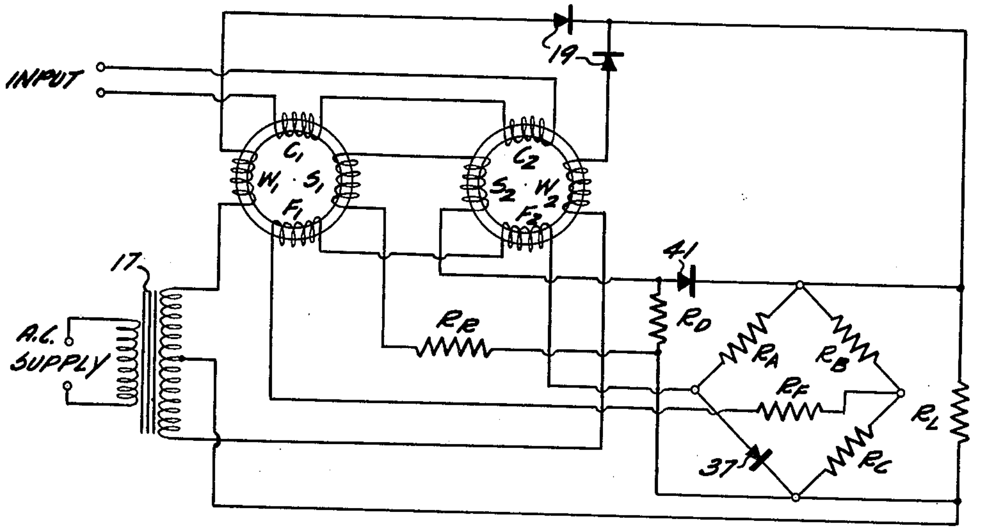
FIGURE 5 is a schematic circuit diagram of another alternative embodiment of the invention.

FIGURE 5 illustrates still another embodiment of the invention which adds to those just described an automatic reset feature. This circuit differs from FIGURE 3 in including bias windings $S_1$ and $S_2$ on the amplifier magnetic core elements 13 and 15, respectively, with the bias signal being produced by voltage drop across a resistor $R_d$ and connected through a level control resistor $R_r$ to the bias windings. The resistor $R_d$ is connected in series with a nonlinear resistance element comprised by unidirectional current flow means 41 preferably of silicon diode type having very high reverse resistance until its reverse breakdown voltage is reached. The circuit branch comprising diode 41 and resistor $R_d$ is connected across the impedance bridge in parallel therewith and with the load resistance $R_L$, with the diode presenting its reverse resistance to the amplifier output.

The reverse resistance of diode 41 is chosen very high with respect to resistor $R_d$, hence virtually all the amplifier output voltage appears across the diode until diode breakdown voltage is reached. Since there is no appreciable current through or voltage drop across $R_d$ until amplifier output reaches diode breakdown voltage value, which by design is near full amplifier output, there is substantially zero reset bias signal until this point is reached.

As the amplifier switches to full "on," however, its output voltage rises to ultimately exceed the diode breakdown voltage value, and the difference between amplifier output voltage and diode breakdown voltage then appears across $R_d$. This difference voltage is applied to the switching amplifier as a reset bias signal of polarity opposing the combined effect of the input and feedback signals.

In effect this reset bias signal constitutes a second feedback signal which is negative in polarity and thus opposes the feedback signal from the impedance bridge network, which latter signal under these conditions is positive in polarity. If this second feedback signal, i.e., the reset bias signal, is equal to or greater than the combined input signal and positive feedback signal from the impedance bridge, the amplifier then will reset to "off" condition. The several elements of the circuit may be so chosen that the reset bias signal is either greater or smaller than the positive feedback signal from the bridge network. If greater, reset may occur even though there is still an input signal to the amplifier of initial polarity but of less than initial magnitude. If smaller, the input signal then must reverse polarity before the amplifier will reset to "off" condition.

Figure 6:
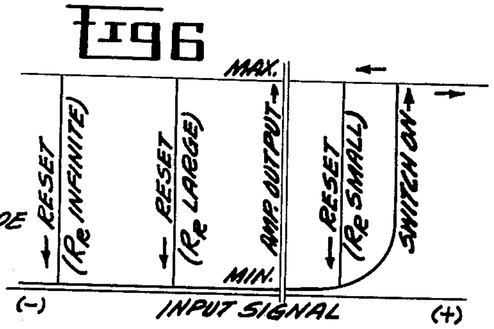
FIGURE 6 illustrates graphically the relationships between input and output voltages in the static switching circuit of FIGURE 5.

These relationships, illustrated graphically in FIGURE 6, are determined by proper selection of the resistance values $R_d$ and $R_r$, primarily the latter since permissible variation of $R_d$ may be limited to some extent by the necessity for it to serve as a current limiting device for diode 41. FIGURE 6 shows that variation of $R_r$ can be effective to vary the reset point over a wide range of input signal levels varying from a positive signal level only slightly below that necessary to switch the amplifier "on" (small $R_r$), to a negative signal level equal in magnitude to the positive feedback signal (infinite $R_r$).

Thus, the diode 41 and resistor $R_d$ provide a controlled self-bias to the switching amplifier operative to automatically reset the amplifier to "off" condition upon reduction in magnitude or reversal of polarity of the input signal, this being accomplished by a self-generated reset signal which becomes operative to at least partially offset the strong interlocking effect of the large positive feedback signal when the amplifier is "on." To prevent any deterioration of accuracy of the "on" switch point of the amplifier or its stability, the reset circuit is so arranged that no reset bias signal can be introduced until the amplifier has been switched "on" to apply an energizing voltage across the bias network. Thus the amplifier in switching to "on" also automatically switches in means for providing its own resetting self-bias.

It will be understood that the nonlinear resistance elements used in the various embodiments of the invention illustrated and described, in either the feedback circuits or the reset circuit in the case of FIGURE 5, need not be of semiconductor diode or incandescent lamp type but may instead be a gas tube or any other suitable nonlinear resistance element having characteristics appropriate to the circuits of the invention as hereinbefore explained. Similarly, the amplifiers used in these circuits need not be of magnetic amplifier type; utilization of the invention with amplifiers of vacuum tube, transistor and other types will be obvious to those skilled in the art.

In the foregoing certain presently preferred embodiments of the invention have been illustrated and described by way of example; many modifications will occur to those skilled in the art and it therefore should be understood that the appended claims are intended to cover all such modifications as fall within the true spirit and scope of the invention.

What is claimed as new and desired to be secured by Letters Patent of the United States is:

1. Static switching apparatus comprising electric amplifier means, a resistance bridge network including a nonlinear resistance element in at least one arm thereof, and circuit means connecting said bridge network to said amplifier means to be energized thereby and to supply to said amplifier means a feedback signal of polarity and magnitude respectively indicative of the direction and extent of bridge unbalance, the resistance characteristic of said one bridge arm including said nonlinear resistance element bearing such relationship to the other bridge arm resistances that at low amplifier output voltage the bridge network is unbalanced in a direction to supply a negative feedback signal to the amplifier and at predetermined higher amplifier output voltage the direction of bridge network unbalance reverses to supply a positive feedback signal to the amplifier.

2. Static switching apparatus comprising electric amplifier means, a resistance bridge network having connected in one arm thereof incandescent filament lamp means the filament resistance of which is relatively higher when heated than when cold, and circuit means connecting said bridge network to said amplifier means to be energized thereby and to supply to said amplifier means a feedback signal of polarity and magnitude respectively indicative of the direction and extent of bridge unbalance, the resistance characteristic of said one bridge arm including said lamp means bearing such relationship to the other bridge arm resistances that at low amplifier output voltage the relatively lower filament resistance of the lamp when cold unbalances the bridge network in a direction to supply a negative feedback signal to the amplifier, and at predetermined higher amplifier output voltage the lamp filament heats and its relatively higher resistance when heated is effective to reverse the direction of bridge network unbalance and supply a positive feedback signal to the amplifier.

3. Static switching apparatus comprising electric amplifier means, a resistance bridge network having connected in one arm thereof an incandescent filament lamp the filament resistance of which is relatively higher when hot than when cold, circuit means connecting said bridge network to said amplifier means to be energized thereby and to supply thereto to said amplifier means a feedback signal of polarity and magnitude respectively indicative of the direction and extent of bridge unbalance, the resistance characteristic of said one bridge arm including said lamp bearing such relationship to the other bridge arm resistances that at low amplifier output voltage the relatively lower filament resistance of the lamp when cold unbalances the bridge network in a direction to supply a negative feedback signal to the amplifier, and at predetermined higher amplifier output voltage the lamp filament heats and its relatively higher resistance when heated is effective to reverse the direction of bridge network unbalance and supply a positive feedback signal to the amplifier, and reset switch means connected across the lamp filament and operative when closed to again reverse the direction of bridge unbalance and supply a negative feedback signal to the amplifier.

4. Static switching apparatus comprising electric amplifier means, a resistance bridge network including in one arm thereof unidirectional current flow means having substantially constant forward voltage characteristic, and circuit means connecting said bridge network to said amplifier means to be energized thereby and to supply to said amplifier means a feedback signal of polarity and magnitude respectively indicative of the direction and extent of bridge unbalance, the voltage drop across said one bridge arm at low amplifier output level being relatively greater and at predetermined higher amplifier output level becoming relatively smaller than the bridge voltages against which balanced, so as to cause bridge unbalance the direction of which reverses at said predetermined higher amplifier output level with resulting reversal of the amplifier feedback signal from negative to positive polarity.

5. Static switching apparatus comprising electric amplifier means, a resistance bridge network including in one arm thereof unidirectional current flow means having substantially constant forward voltage characteristic, circuit means connecting said bridge network to said amplifier means to be energized thereby and to supply to said amplifier means a feedback signal of polarity and magnitude respectively indicative of the direction and extent of bridge unbalance, the voltage drop across said one bridge arm at low amplifier output level being relatively greater and at predetermined higher amplifier output level becoming relatively smaller than the bridge voltages against which balanced, so as to cause bridge unbalance the direction of which reverses at said predetermined higher amplifier output level with resulting reversal of the amplifier feedback signal from negative to positive polarity, and reset switch means connected across another bridge arm operative upon actuation to again reverse the direction of bridge unbalance with resulting reversal of the amplifier feedback signal from positive to negative polarity.

6. Static switching apparatus comprising electric amplifier means, a resistance bridge network including a first nonlinear resistance element in at least one arm thereof, circuit means connecting said bridge network to said amplifier means to be energized thereby and to supply to said amplifier means a first feedback signal of polarity and magnitude respectively indicative of the direction and extent of bridge unbalance, the resistance characteristics of the several bridge arms bearing such relationship to each other that at low amplifier output voltage the bridge network is unbalanced in a direction to make said first feedback signal negative in polarity and at predetermined higher amplifier output voltage the direction of bridge network unbalance reverses to make said first feedback signal positive in polarity, and amplifier reset means including a second nonlinear resistance element and circuit means connecting said second nonlinear resistance element to said amplifier means in a manner to produce a second degenerative feedback signal to said amplifier means on reaching a predetermined amplifier output level.

7. Static switching apparatus comprising electric amplifier means, a resistance bridge network including a nonlinear resistance element in at least one arm thereof, circuit means connecting said bridge network to said amplifier means to be energized thereby and to supply to said amplifier means a feedback signal of polarity and magnitude respectively indicative of the direction and extent of bridge unbalance, the resistance characteristic of said one bridge arm including said nonlinear resistance element bearing such relationship to the other bridge arm resistances that at low amplifier output voltage the bridge network is unbalanced in a direction to supply a negative feedback signal to the amplifier and at predetermined higher amplifier output voltage the direction of bridge network unbalance is reversed to supply a positive feedback signal to the amplifier, and reset switch means connected across a bridge resistance element and operative upon actuation to again reverse the direction of bridge unbalance to supply a negative feedback signal to the amplifier.

8. Static switching apparatus comprising electric amplifier means, an impedance bridge network including bridge arms the impedance of at least one of which varies as a function of applied voltage, circuit means connecting said bridge network to said amplifier means to be energized thereby and to supply to said amplifier means a feedback signal indicative of bridge unbalance, with the voltage drop across said one bridge arm at a first predetermined amplifier output level being greater than the bridge voltages against which balanced so the resulting bridge unbalance produces an amplifier feedback signal of one polarity, and with the voltage drop across said one arm at a second predetermined amplifier output level being smaller than the bridge voltages against which balanced so the resulting bridge unbalance produces an amplifier feedback signal of reversed polarity.

9. Static switching apparatus comprising the combination of electrical amplifier means and an impedance bridge network, said bridge network having input connections and bridge balance connections, means to supply an energizing signal to said amplifier, circuit means connected between said amplifier and said bridge network input connections to transmit the amplifier output signal to said bridge network, circuit means connected between said amplifier and said bridge balance connections to transmit a feedback signal to said amplifier proportional in polarity and magnitude to said bridge unbalance, at least one arm of said bridge network including an impedance which varies in value with said amplifier output voltage, said impedance value being proportional with respect to the other bridge impedances to cause a bridge balance change at a predetermined voltage within the output voltage range of said amplifier to reverse the polarity of said bridge balance signal whereby when said amplifier output voltage is below said predetermined voltage said feedback signal is degenerative and when said amplifier voltage output is greater than said predetermined voltage said feedback signal is regenerative.

References Cited in the file of this patent

UNITED STATES PATENTS 2,673,960 Doblmaier ------------ Mar. 30, 1954

2,721,304 Silver et al. ----------- Oct. 18, 1955
2,731,203 Miles ---------------- Jan. 17, 1956
2,773,137 Hollmann -------------- Dec. 4, 1956
2,977,481 Rosa ----------------- Mar. 28, 1961

FOREIGN PATENTS 1,093,382 France --------------- May 3, 1955

OTHER REFERENCES

"Magnetic Amplifier Circuits and Applications," by R. A. Ramey, in "Electrical Engineering," September 1953, pp. 791–795.

"Fast Acting Digital Memory Systems," by I. L. Auerbach, in "Electrical Manufacturing," October 1953, pp. 100–107.